United States Patent [19]

Kai et al.

[11] Patent Number: 5,302,452

[45] Date of Patent: Apr. 12, 1994

[54] DRAWN PLASTIC PRODUCT AND A METHOD FOR DRAWING A PLASTIC PRODUCT

[75] Inventors: Tsugihiko Kai, Otsu; Masao Seki, Kusatsu; Fumiko Kawai, Kusatsu; Kazuyoshi Koide, Kusatsu, all of Japan

[73] Assignee: Toray Industries, Inc., Japan

[21] Appl. No.: 41,807

[22] Filed: Apr. 1, 1993

Related U.S. Application Data

[63] Continuation of Ser. No. 743,384, Sep. 23, 1991, abandoned.

[51] Int. Cl.⁵ .............................................. D02G 3/00
[52] U.S. Cl. .................................... 428/364; 264/22; 204/165
[58] Field of Search .................. 264/22; 204/165; 428/364

[56] References Cited

U.S. PATENT DOCUMENTS

| | | | |
|---|---|---|---|
| 3,853,657 | 12/1974 | Lawton | 204/165 |
| 3,860,369 | 1/1975 | Brethauer et al. | 264/22 |
| 3,959,104 | 5/1976 | Fales | 204/165 |
| 3,992,495 | 11/1976 | Sano et al. | 264/22 |
| 4,101,525 | 7/1978 | Davis et al. | 264/290.5 |
| 4,134,882 | 1/1979 | Frankfurt et al. | 264/176.1 |
| 4,140,607 | 2/1979 | Kreiselmeier et al. | 204/165 |
| 4,195,051 | 3/1980 | Frankfurt et al. | 264/210.2 |
| 4,195,052 | 3/1980 | Davis et al. | 264/210.5 |
| 4,195,161 | 3/1980 | Davis et al. | 264/210.5 |
| 4,328,324 | 5/1982 | Kock et al. | 204/165 |
| 4,402,900 | 9/1983 | Berry, Jr. | 264/204 |
| 4,419,869 | 12/1983 | Sando et al. | 204/165 |
| 4,548,867 | 10/1985 | Ueno et al. | 264/22 |
| 4,608,212 | 8/1986 | Isner | 264/22 |
| 4,609,445 | 9/1986 | Collins | 204/165 |
| 4,693,799 | 8/1987 | Yanagihara et al. | 204/165 |
| 4,717,516 | 1/1988 | Isaka et al. | 264/22 |
| 4,869,958 | 9/1989 | Murase et al. | 428/364 |
| 4,911,867 | 3/1990 | Burlet et al. | 204/165 |
| 5,001,008 | 3/1991 | Tokita et al. | 428/364 |
| 5,045,257 | 9/1991 | Nakagawa et al. | 264/83 |
| 5,108,780 | 4/1992 | Pitt et al. | 427/40 |

FOREIGN PATENT DOCUMENTS 5716915 5/1984 Japan .
60-228545 11/1985 Japan .

*Primary Examiner*—Patrick J. Ryan
*Assistant Examiner*—N. Edwards
*Attorney, Agent, or Firm*—Austin R. Miller

[57] ABSTRACT

The present invention relates to a drawn plastic product with high strength, high modulus and excellent thermal dimensional stability and a method for preparation thereof.

Practically, a drawn plastic product with high strength, high modulus and excellent thermal dimensional stability is obtained by drawing a plastic product, for example, a polyester or a polyamide product, in a low temperature plasma.

2 Claims, No Drawings

DRAWN PLASTIC PRODUCT AND A METHOD FOR DRAWING A PLASTIC PRODUCT

This application is a continuation of application Ser. No. 07/743,384, filed Sep. 23, 1991, now abandoned.

TECHNOLOGICAL FIELD

The present invention relates to a drawn plastic product with high strength, high modulus and excellent thermal dimensional stability and a method for preparing it.

BACKGROUND TECHNOLOGY

Up to the present time, for preparing a high strength plastic product, especially for preparing high strength fiber and film for industrial applications, increasing the degree of polymerization by means of solid state polymerization, a special drawing method, for example, a zone heat treatment and drawing and a method for drawing by means of induction heating have been used.

However, for example, in the zone heat treatment and drawing method, a complicated arrangement of installation such as high temperature heating, quenching, high temperature heat setting etc., is necessary and a little change in a balance between heating and cooling results in fluctuation of fiber characteristics. In addition, structural defects easily occur by both extreme treatments consisting of quick heating and quick cooling and it is difficult to satisfy both high strength and high modulus at the same time.

The present invention offers a plastic product with high strength, high modules and high thermal dimensional stability and a method for preparing conveniently and stably it.

DISCLOSURE OF THE INVENTION

The present invention relates to a method of drawing of a plastic product characterized by drawing a plastic product in a low temperature plasma atmosphere.

Furthermore, the present invention related to a polyester fiber characterized by satisfying the following characteristics (1)–(7) at the same time.
(1) Inherent viscosity: 0.8 or smaller
(2) Tensile strength: 7.0 g/d or larger
(3) Initial modulus: 140 g/d or larger
(4) Values of long range period obtained by means of X-ray diffraction satisfies the following relation:

$$De > Dm$$

wherein De is a value of long range period in the equatorial direction; Dm is a value of long range period in the meridional direction
(5) Density (g/cm$^3$): 1.3800 or larger
(6) Shrinkage in boiling water: 5% or smaller
(7) Dry heat shrinkage at 150° C.: 5% or smaller Furthermore, the present invention relates to a polyamide fiber characterized by that at least 75% or more repeating units consists of capramide units and the following characteristics (1)–(7) are satisfied at the same time.
(1) Relative viscosity: 3.0 or smaller
(2) Tensile strength: 6 g/d or larger
(3) Initial modulus: 35 g/d or larger
(4) Elongation at break: 16% or smaller
(5) Birefringence: 55×10$^{-3}$ or larger
(6) Density: 1.1400 or larger
(7) Shrinkage in boiling water: 8% or smaller A drawn plastic product with high strength, high modulus and high thermal dimensional stability can be prepared stably by the present invention.

THE BEST EMBODIMENTS PRACTICING THE PRESENT INVENTION

A plastic product in the present invention means any product such as fibrous, film-like and rod-like products. When a thermoplastic polymer is used as the raw material of the plastic, the effect of the present invention can be remarkably exhibited.

As one representative example of the thermoplastic polymers, polyester polymers can be cited. As the example, plyethylene terephthalate, polybutylene terephthalate or a material obtained by copolymerizing or blending the third ingredient, for example, isophthalic acid sulfonate, adipic acid, isophthalic acid or polyethylene glycol therewith can be cited.

In addition, as another representative example of thermoplastic polymers, polyamide polymers can be cited. Preferable one among polyamide polymers of the present invention is such a polyamide that 75% or more repeating units are capramide units or hexamethylene adipamide units and as the examples, nylon-6, nylon-6,6, nylon-6,10, nylon-6,12, nylon-7, nylon-11, nylon-12 etc., can be cited and nylon-6 and nylon-6,6 are especially preferable.

Furthermore, as other thermoplastic polymers, such polymers as polyethylene, polyvinyl chloride, polyvinyl alcohol and fluoropolymer such as polyvinylidene fluoride can be cited.

In these polymers, catalysts, color protection agents, anti-oxidants, ultraviolet absorbing agents, flame-retardants, inorganic fine particles etc., can be properly incorporated.

Any molding method can be used for molding these polymers. When the product is fibrous, these polymers are usually made into chips at first and then they are melted, extruded from an orifice, cooled and wound up.

These fibrous products may be constituted of a single polymer or two or more different polymers in the crosssectional direction such as a core-sheath structure, a side-by-side structure or an amorphously arranged structure seen in a polymer alloy.

In addition, the crosssectional shapes of these fibrous products may be close to a circle as well as an ellipse, a polygon or hollow. No limitation exists on the crosssectional shape of the product of the present invention. These fibrous products can be used as they are, but those products which are drawn at ordinary temperature or while they are heated by means of a hot plate, a hot roller, a high temperature gas, a high temperature liquid etc., or after heating or are furthermore heated after drawing can be used.

In addition, when the product is sheet-like, it is obtained usually by heating these polymers at a melting temperature thereof or higher to make a molten state, extruding it from a slit-like orifice and cooling and widing the extruded sheet. In the present invention, these sheet-like products can be used as they are, but those products which are drawn at ordinary temperature or while heated by means of a hot plate, a hot roller, a high temperature gas, a high temperature liquid etc., or after heating in the continuous direction and/or the width direction or furthermore heated after drawing can be used. These sheet-like products may be constituted of a single polymer or two or more different polymers in the width direction and/or the thickness direction.

In the present invention, it is a feature that these plastic products are drawn in a low temperature plasma.

The low temperature plasma of the present invention is generated by applying a high electric voltage in a vacuum container wherein a specified gas is sealed. As the electric discharge, there are various types such as spark discharge, corona discharge and glow discharge but the glow discharge with uniform discharge and excellent activation action is especially preferable. As the discharge frequency, low frequency, high frequency and microwave can be used and direct current can be used, too.

As a gas providing activation, for example, nonpolymerizable gas such as Ar, $N_2$, He, $CO_2$, CO, $O_2$, $H_2O$, $CF_4$, $NH_3$, $H_2$ and air are preferable and a mixture of two or more thereof can be also used. Ar, He, $N_2$, air, CO and $H_2O$ with no strong etching action are especially preferable. In addition, from the viewpoints of economy and easiness of handling, air is especially preferable.

It is preferable from the viewpoints of economy and stability of electric discharge that the low temperature plasma treatment is performed at a gas pressure of 0.01–50 Torr, preferably 0.5–20 Torr. Namely, when the gas pressure is 0.01 Torr or lower, a strong vacuum pump is required to keep a high vacuum and the costs for installation and electric power for it are high. On the contrary, when the gas pressure is 50 Torr or higher, electric discharge is unstable and in addition, as application of an electric energy of an extremely high pressure is required to generate electric discharge, it is not preferable from a viewpoint of electric power consumption.

The surface of the plastic product of the present invention is provided as a matter of course with an oxygen-containing group bound with the surface molecule such as carbonyl group, carboxyl group, hydroxyl group and hydroxyperoxide group by drawing it in the low temperature plasma. In addition, depending on the kind of the gap used, a nitrogen-containing group is produced and SR characteristics and water-absorbing characteristics are simultaneously provided. As a polymerizable gas such as $C_2F_4$ and trimethoxysilane forms a polymerized film on the surface of a plastic to obstruct drawability in some cases, but for providing such a characteristics as water repellency, it is possible to use one of these gases alone, or a mixed gas of two or more thereof or a mixture of one or more gases of these polymerizable gases with one or more said nonpolymerizable gases.

No limitation exists on an apparatus for practicing the present invention. A batch type apparatus wherein a drawing apparatus is combined in a vacuum container and a continuous type apparatus wherein a sealing type is used and a treating product can be drawn air-to-air can be used. In addition, before or after a low temperature plasma drawing zone, if necessary, a heating apparatus such as a hot plate, a hot roller and a hot fluid zone can be connected and a cooling apparatus such as a low temperature plate, a low temperature roller and a low temperature fluid zone can be also connected.

When an undrawn product, a semi-drawn product or a drawn product of a plastic product is drawn by means of the method of drawing of the present invention, it is one of the features that the draw ratio just before breakage (hereinbelow described as a limiting draw ratio) becomes remarkably higher than the limiting draw ratio of the conventional method of drawing and it is thereby possible to obtain a drawn product with high strength, high modulus and excellent low shrinkage which has not been obtained at all by the conventional method of drawing. This could be because the polymer molecules in the plastic product are remarkably activated by means of the low temperature plasma and an extremely smooth drawing can be performed thereby.

In general, to obtain a high tenacity product, various devices to enlarge the degree of polymerization such as extending polymerization time and performing a solid state polymerization are performed but the manufacturing cost becomes higher in proportion thereto. However, when a polyester fibrous product is drawn by means of the method of drawing of the present invention, even if a polymer with an inherent viscosity of 0.8 or lower which can be manufactured with a low manufacturing cost is used, a drawn product with higher strength, higher modulus and smaller thermal shrinkage than those of the drawn product obtained by drawing a polyester fibrous product with a high degree of polymerization of an inherent viscosity of 0.8 or larger by means of the conventional method of drawing can be easily obtained. Describing more particularly, even if a polyester fibrous product with an inherent viscosity of 0.8 or smaller is used, a fibrous product which exhibits not only extremely high tensile characteristics such as a tensile strength of 7.0 g/d or higher and an initial modulus of 140 g/d but also extremely high dimensional stability such as a boiling water shrinkage of 5% or lower and a dry heat shrinkage at 150° C. of 5% or lower can be obtained. In general, to obtain high tenacity and high modulus, drawing with a high drawing ratio is usually performed but a polyester fiber thus obtained usually exhibits high boiling water shrinkage or high dry heat shrinkage. On the contrary, to suppress shrinkage low, a relaxed heat treatment is usually performed, but in this case, only a polyester fiber product with a low strength and a low initial modulus is ordinary obtained. By the present invention, it is possible to prepare inexpensively a polyester fiber product satisfying simultaneously high tensile characteristics and high dimensional stability which has not been obtained by the conventional technologies.

Furthermore, by the present invention, even if the inherent viscosity of a polyester fiber product is 0.8 or smaller, it is a feature that a fiber with a density of 1.3800 g/cm$^3$ can be obtained. By using a polyester fiber product with an inherent viscosity of 0.8 or lower, it is usually not easy to obtain such a high density as this and therefore, it is difficult to obtain said high tensile characteristics.

In addition, by the present invention, even if the inherent viscosity of the polyester fiber product is 0.8 or smaller, a fiber product wherein a value of long range period in the equatorial direction of the crystal De obtained by means of X-ray diffraction is larger than a value of long range period in the meridional direction is obtained. In a polyester fiber product with an inherent viscosity of 0.8 or smaller, De is usually smaller than Dm and it is thought that one of the reasons why the polyester fiber product obtained by the present invention exhibits excellent tensile characteristics is based on the unique characteristics of this crystal structure.

This feature can be seen in drawing of a polyamide fiber product. When an undrawn product, a semi-drawn product or a drawn product of a polyamide fiber is drawn, even if a polymer with a relative viscosity of 3.0 or smaller which is manufactured inexpensively is used, a drawn product with higher strength, higher modulus and smaller thermal shrinkage than those of a drawn product drawn by means of the conventional method can be easily obtained. Describing more practically, even if a polyamide fiber product with a relative viscosity of 3.0 or smaller is used, a fiber product exhibiting not only extremely high values such as a tensile strength of 6.0 g/d or larger and an initial modulus of 35 g/d but also extremely high dimensional stability such as a boiling water shrinkage of 8% or smaller can be obtained. Furthermore, by the present invention, even if the relative viscosity of the polyamide fiber is 3.0 or smaller, a density of 1.14 g/cm$^3$ or larger and a birefringence of $55 \times 10^{-3}$ or larger can be obtained. In case of a polyamide fiber with a relative viscosity of 3.0 or smaller, it is usually not easy to obtain such a high density as this and it is therefore difficult to obtain said high tensile characteristics.

The present invention will be explained hereinbelow in more detail by Examples, but the interpretation of the present invention is not restricted by these Examples.

In addition, physical properties and internal structural parameters of fibers shown in Examples and Comparative Examples were measured by the following methods.

(1) Tensile Strength, Elongation at Break and Initial Modulus (Initial Tensile Resistance)

These values were measured by means of JIS-L1017. Namely, a sample was taken as a hank and after the hank was kept on standing in a room where temperature and moisture were conditioned at 20° C. and 65% RH for 24 hr or longer, using a tensile tester "Tensilon UTL-4L" (manufactured by Toyo Bowldwin Co., Ltd.), measurements were performed under a condition of a sample length of 25 cm and a tensile speed of 30 cm/min.

(2) Boiling Water Shrinkage ΔS

A sample was taken as a hank and after the hank was kept on standing in a room conditioned at 20° C. and 65% RH for 24 hr or longer, a sample with a length $L_0$ measured under a load corresponding to 0.1 g/d of the sample was put in a fabric bag and treated in a boiling water under unstretched state for 30 min. After the treatment, the sample was air-dried and after it is kept on standing in said temperature and humidity conditioned room for 24 hr or longer. The length L measured under said load was measured and the value was calculated by the following equation.

$$\Delta S (\%) = \{(L_0 - L)/L_0\} \times 100$$

(3) Dry Heat Shrinkage

A sample was taken in a hank shape and after the sample was kept on standing in a room where the temperature and the humidity were conditioned at 20° C. and 65% RH for 24 hr or longer, a sample with a length $L_0$ measured under a load corresponding to a load of 0.1 g/d of the sample was treated in an oven at 150° C. for 30 min under unstretched state. The sample after treatment was kept on cooling and kept on standing in said temperature and humidity conditioned room for 24 hr or longer. The length L was measured under said load and the value was calculated by the following equation.

$$\Delta S (\%) = \{(L_0 - L)/L_0\} \times 100$$

(4) Inherent Viscosity (IV)

A sample was dissolved in a o-chlorophenol solution and the IV was measured at 25° C. by using an Ostwald viscometer.

(5) Relative Viscosity 1 g sample was dissolved in 98% sulfuric acid and the relative viscosity was measured at 25° C. by using an Ostwald viscometer.

(6) Birefringence

Using a POH type polarized microscope manufactured by Nippon Kagaku K. K., it was measured by the ordinary Berek compensator method.

(7) Density

Using a density gradient tube prepared by using carbon tetrachloride as a heavy liquid and n-heptane as a light liquid, it was measured at 25° C.

(8) Long Range Period

Values in the equatorial direction (De) and in the meridional direction (Dm) were obtained from a small angle X-ray scattering photograph.

Photographing conditions of small angle X-ray scattering

X-ray generating apparatus:
RU-Type 200 manufactured Rigaku Corporation
X-ray source: CuKα ray (Ni filter was used)
Output: 50 kV 150 mA
Slit system: 0.3 mmφ
Photographing condition:
Radius of camera: 400 mm
Exposure time: 120 min
Film: Kodak DEF-5

EXAMPLES 1-6, COMPARATIVE EXAMPLES 1-4

A semi-drawn filament of polyethylene terephthalate with 140 denier and 24 filaments was obtained by means of a well known melt spinning process with a spinning speed of 3,000 m/min. The inherent viscosity of said filament was 0.63. Drawing of this filament was performed under the following conditions by means of a continuous processing type plasma treating machine with a sealing mechanism on both ends.

Low temperature plasma conditions

Gas used: Air
Frequency: 110 kHz
Treating pressure: 8, 10 Torr
Applied electric voltage: 3, 4 kV
Physical properties of drawn filaments drawn in a plasma atmosphere were shown in Table 1.

As Comparative Examples, samples without drawing in a plasma atmosphere but drawn by using hot plates at 90° C. and 150° C. (Comparative Examples 1 and 2), a sample cold-drawn without using a hot plate (Comparative Example 3) and a sample cold-drawn under a vacuum of 10 Torr (Comparative Example 4) (all the samples were drawn each at its limiting drawing ratio) were prepared and physical properties of each filament were shown in Table 1.

Filaments drawn in a plasma atmosphere exhibited high tenacity and high modulus which were the same level as those of an ordinary filament using a raw material with a high degree of polymerization and a filament of high quality having simultaneously such characteristics as high crystallinity and low shrinkage can be achieved to prepare. In addition, in the drawing performed in a plasma atmosphere, drawability can be improved remarkably.

EXAMPLES 7-11, COMPARATIVE EXAMPLES 5-6

An undrawn filament with 240 denier and 24 filaments was obtained by a well known melt spinning process of a nylon 6 chip with a relative viscosity of 2.6 at a spinning speed of 900 m/min. Drawing of this filament was performed in the following atmosphere by using a continuous processing type plasma treating machine with a seal mechanism on both ends.

low temperature plasma conditions

Gas used: Air
Treating pressure: 10 Torr
Frequency: 110 kHz
Applied electric voltage: 3, 4 kV Then, physical properties of drawn filaments drawn in a plasma atmosphere were shown in Table 2.

As Comparative Examples, physical properties of samples using a hot plate at 100° C. (Comparative Example 6) and a filament drawn at a limiting draw ratio by means of an ordinary method without using a hot plate (Comparative Example 5) were shown in Table 2. High strength, high modulus, low elongation, high orientation and low shrinkage were simultaneously achieved on the filaments of the present invention.

EXAMPLES 12-13, COMPARATIVE EXAMPLE 7

A semi-drawn filament with 105 denier and 24 filaments was obtained by means of an ordinary melt spinning process of a nylon 6 chip with a relative viscosity of 2.6 at a spinning speed of 2,300 m/min. Plasma drawings of this filament were performed under conditions shown in Table 3 by using the same apparatus as that in Examples 1-5 and physical properties of the filaments were shown in Table 3.

As Comparative Example, physical properties of a filament drawn at a limiting draw ratio under an ordinary cold drawing condition were shown in Table 3 (Comparative Example 7).

High strength, high modulus, low elongation, high orientation and low shrinkage were simultaneously achieved on the filaments of the present invention.

POSSIBILITY OF INDUSTRIAL APPLICATIONS

A drawn plastic product with high strength, high modulus and high thermal dimensional stability can be stably manufactured by the present invention.

TABLE 1

| | Drawing conditions | | | | | | Physical properties of drawn fibers | | |
|---|---|---|---|---|---|---|---|---|---|
| | | | Plasma condition | | | | | | |
| | Drawing speed (m/min) | Drawing ratio (fold) | Gas | Pressure (Torr) | Applied electric voltage (kV) | Heating temp. (°C.) | Pressure (Torr) | Denier (D) | Tenacity (g/d) | Elongation (%) |
| Example 1 | 50 | 2.0 | Air | 10 | 4 | — | — | 69.5 | 7.1 | 15.9 |
| Example 2 | 50 | 2.1 | Air | 10 | 4 | — | — | 68.0 | 7.4 | 11.9 |
| Example 3 | 50 | 2.2 | Air | 10 | 4 | — | — | 64.2 | 8.9 | 10.2 |
| Example 4 | 50 | 2.6 | Air | 10 | 3 | — | — | 56.0 | 9.3 | 6.9 |
| Example 5 | 50 | 2.6 | Air | 10 | 4 | — | — | 55.9 | 9.4 | 6.5 |
| Example 6 | 50 | 2.6 | Air | 8 | 4 | — | — | 55.1 | 9.4 | 6.6 |
| Comparative Example 1 | 50 | 2.1 | — | — | — | 90 | — | 67.9 | 5.2 | 28.5 |
| Comparative Example 2 | 50 | 2.1 | — | — | — | 150 | — | 68.2 | 6.3 | 11.7 |
| Comparative Example 3 | 50 | 2.0 | — | — | — | Cold | — | 69.7 | 5.0 | 13.8 |
| Comparative Example 4 | 50 | 2.0 | — | — | — | — | 10 | 70.2 | 5.8 | 14.0 |

| | Physical properties of drawn fibers | | | | | | | |
|---|---|---|---|---|---|---|---|---|
| | Modulus of Elasticity (g/d) | Birefringence ($\times 10^{-3}$) | Density (g/cm$^3$) | Inherent viscosity ($\eta$) | Long range period (Å) | | Boiling water shrinkage (%) | Dry heat shrinkage (%) |
| | | | | | De | Dm | | |
| Example 1 | 141 | 174.4 | 1.3830 | 0.644 | 190 | 140 | 4.1 | 4.9 |
| Example 2 | 140 | 175.2 | 1.3906 | 0.647 | 228 | 140 | 3.3 | 4.5 |
| Example 3 | 145 | 178.4 | 1.4005 | 0.639 | 180 | 140 | 3.1 | 4.1 |
| Example 4 | 158 | 179.8 | 1.4116 | 0.636 | 175 | 140 | 3.3 | 4.5 |
| Example 5 | 168 | 188.2 | 1.4010 | 0.639 | 168 | 140 | 3.1 | 4.8 |
| Example 6 | 163 | 180.6 | 1.3995 | 0.635 | 179 | 140 | 3.1 | 5.0 |
| Comparative Example 1 | 100 | 148.2 | 1.3795 | 0.632 | 102 | 140 | 8.0 | 10.5 |
| Comparative Example 2 | 110 | 171.4 | 1.3826 | 0.642 | 123 | 140 | 5.3 | 9.0 |
| Comparative Example 3 | 90 | 138.9 | 1.3705 | 0.630 | 100 | 140 | 19.5 | 18.5 |
| Comparative Example 4 | 95 | 159.6 | 1.3812 | 0.632 | 112 | 140 | 13.5 | 17.2 |

TABLE 2

| | Drawing conditions | | | | Physical properties of drawn fibers | | | | | | | |
|---|---|---|---|---|---|---|---|---|---|---|---|---|
| | Drawing speed (m/min) | Drawing ratio (fold) | Gas | Pressure (Torr) | Applied electric voltage (kV) | Denier (D) | Tenacity (g/d) | Elongation (%) | Modulus of elasticity (g/d) | Birefringence ×10⁻³ | Density (g/m³) | Relative viscosity | Boiling water shrinkage (%) |
| Example 7 | 50 | 3.5 | Air | 10 | 3 | 68.9 | 6.2 | 15.9 | 38 | 55.4 | 1.140 | 2.68 | 7.9 |
| Example 8 | 50 | 4.0 | Air | 10 | 3 | 60.0 | 7.4 | 14.6 | 42 | 56.9 | 1.141 | 2.70 | 7.8 |
| Example 9 | 50 | 4.0 | Air | 10 | 4 | 59.8 | 7.9 | 13.5 | 42 | 58.1 | 1.141 | 2.69 | 7.5 |
| Example 10 | 50 | 4.5 | Air | 10 | 4 | 53.9 | 8.2 | 12.5 | 44 | 60.1 | 1.142 | 2.71 | 7.6 |
| Example 11 | 50 | 5.0 | Air | 10 | 4 | 49.2 | 8.7 | 10.1 | 52 | 62.9 | 1.142 | 2.71 | 7.2 |
| Comparative Example 5 | 50 | 3.5 | (Cold drawing) | | | 69.2 | 4.8 | 42.7 | 27 | 52.1 | 1.138 | 2.70 | 12.5 |
| Comparative Example 6 | 50 | 4.0 | (Hot plate drawing at 100° C.) | | | 60.8 | 5.0 | 39.8 | 29 | 53.6 | 1.138 | 2.72 | 12.0 |

TABLE 3

| | Drawing conditions | | | | Physical properties of drawn fibers | | | | | | | |
|---|---|---|---|---|---|---|---|---|---|---|---|---|
| | Drawing speed (m/min) | Drawing ratio (fold) | Gas | Pressure (Torr) | Applied electric voltage (kV) | Denier (D) | Tenacity (g/d) | Elongation (%) | Modulus of elasticity (g/d) | Birefringence ×10⁻³ | Density (g/m³) | Relative viscosity | Boiling water shrinkage (%) |
| Example 11 | 50 | 1.5 | Air | 7 | 3 | 70.8 | 7.2 | 10.9 | 36 | 55.4 | 1.143 | 2.62 | 7.6 |
| Example 13 | 50 | 1.8 | Air | 7 | 3 | 58.0 | 8.9 | 10.5 | 45 | 59.1 | 1.148 | 2.60 | 7.6 |
| Comparative Example 7 | 50 | 1.5 | (Cold drawing) | | | 71.2 | 5.7 | 22.8 | 21 | 52.9 | 1.139 | 2.62 | 12.1 |

We claim:

1. A polyester fiber having all of the following properties:
    (1) A tensile strength of 7.0 g/d or larger;
    (2) An initial modulus of 140 g/d or larger;
    (3) The long range period X-ray diffraction value in the equatorial direction (De) is greater than the long range period X-ray diffraction value in the meridional direction (Dm); and
    (4) Density (g/cm³): 1.3800 or larger.
2. A polyester fiber described in claim 1 wherein the polyester fiber is a polyethylene terephthalate fiber.

* * * * *